United States Patent
Strandell

(10) Patent No.: US 9,555,500 B2
(45) Date of Patent: Jan. 31, 2017

(54) METHOD OF JOINING TWO MATERIALS BY DIFFUSION WELDING

(71) Applicant: Ingemar Strandell, Sävedalen (SE)

(72) Inventor: Ingemar Strandell, Sävedalen (SE)

(73) Assignee: AKTIEBOLAGET SKF, Goteborg (SE)

(*) Notice: Subject to any disclaimer, the term of this patent is extended or adjusted under 35 U.S.C. 154(b) by 0 days.

(21) Appl. No.: 14/783,448

(22) PCT Filed: Apr. 7, 2014

(86) PCT No.: PCT/SE2014/000043
§ 371 (c)(1),
(2) Date: Oct. 9, 2015

(87) PCT Pub. No.: WO2014/168547
PCT Pub. Date: Oct. 16, 2014

(65) Prior Publication Data
US 2016/0318118 A1  Nov. 3, 2016

(30) Foreign Application Priority Data

Apr. 10, 2013 (SE) ........................................ 1300262

(51) Int. Cl.
*B23K 20/00* (2006.01)
*B23K 20/02* (2006.01)
*B23K 20/16* (2006.01)
*F16C 33/62* (2006.01)
*F16C 33/64* (2006.01)
(Continued)

(52) U.S. Cl.
CPC ............... *B23K 20/021* (2013.01); *B22F 3/15* (2013.01); *B22F 5/106* (2013.01); *B22F 7/04* (2013.01); *B23K 20/02* (2013.01); *B23K 20/16* (2013.01); *F16C 33/34* (2013.01); *F16C 33/62* (2013.01); *F16C 33/64* (2013.01); *B23K 2203/04* (2013.01); *B23K 2203/05* (2015.10);
(Continued)

(58) Field of Classification Search
CPC ..... B23K 20/00–20/002; B23K 20/008–20/04; B23K 2203/02–2203/06; B22F 3/15; B22F 5/106; B22F 7/04; F16C 33/62; F16C 33/64; F16C 2204/66; F16C 2204/62; F16C 2204/72; F16C 2226/36
USPC .................................................. 228/193–195
See application file for complete search history.

(56) References Cited

U.S. PATENT DOCUMENTS 1,896,411 A * 2/1933 Maskrey ................ B23K 20/04
219/76.12
2,102,394 A * 12/1937 Trembour .............. B23K 20/04
164/109
(Continued)

FOREIGN PATENT DOCUMENTS

DE  2328714 A1 * 1/1975 ........... B22D 11/059
EP  0847826 A1 * 6/1998
(Continued)

OTHER PUBLICATIONS

U.S. Class 228 definition, Jan. 2002.*

*Primary Examiner* — Kiley Stoner
(74) *Attorney, Agent, or Firm* — Byan Peckjian; SKF USA Inc. Patent Dept.

(57) ABSTRACT

A method to join a first material and a second material by diffusion welding, wherein a third material is put in between the first material and the second material during the joining process.

20 Claims, 2 Drawing Sheets

(51) Int. Cl.
*F16C 33/34* (2006.01)
*B22F 3/15* (2006.01)
*B22F 5/10* (2006.01)
*B22F 7/04* (2006.01)

(52) U.S. Cl.
CPC ...... *F16C 2204/62* (2013.01); *F16C 2204/66* (2013.01); *F16C 2204/72* (2013.01); *F16C 2226/36* (2013.01)

(56) References Cited

U.S. PATENT DOCUMENTS

| | | | | |
|---|---|---|---|---|
| 2,438,759 | A * | 3/1948 | Liebowitz | B23K 20/04 148/534 |
| 3,142,560 | A * | 7/1964 | Storchheim | B22F 7/04 266/249 |
| 3,403,010 | A * | 9/1968 | MacDonald | B22F 7/04 427/203 |
| 3,475,812 | A * | 11/1969 | Manganello | B23K 20/227 228/190 |
| 4,429,824 | A * | 2/1984 | Woodward | B23K 20/233 228/15.1 |
| 4,703,885 | A | 11/1987 | Lindgren et al. | |
| 4,795,078 | A * | 1/1989 | Kuroki | B21C 37/06 228/131 |
| 5,403,670 | A * | 4/1995 | Ohsue | B21B 27/00 419/11 |
| 5,648,176 | A * | 7/1997 | Nakagawa | B01J 35/04 228/181 |
| 5,683,822 | A * | 11/1997 | Hasegawa | B23K 20/023 148/403 |
| 5,759,300 | A * | 6/1998 | Hasegawa | B23K 35/0233 148/403 |
| 5,919,577 | A * | 7/1999 | Hasegawa | B23K 20/023 148/325 |
| 6,109,504 | A * | 8/2000 | Groll | A47J 37/067 228/107 |
| 6,589,671 | B1 * | 7/2003 | Kehrer | B23K 15/0073 219/121.11 |
| 6,689,328 | B1 * | 2/2004 | Otani | B01J 35/04 228/181 |
| 2001/0043892 | A1 * | 11/2001 | Matsuoka | B01J 35/04 422/211 |
| 2001/0055695 | A1 * | 12/2001 | Sato | B22F 7/04 428/553 |
| 2002/0142186 | A1 * | 10/2002 | Sato | B22F 7/04 428/676 |
| 2003/0134144 | A1 * | 7/2003 | Muroshige | B23K 20/04 428/683 |
| 2006/0035082 | A1 * | 2/2006 | Hattori | B21B 27/032 428/408 |
| 2006/0163321 | A1 * | 7/2006 | Hasegawa | B23K 11/0033 228/101 |
| 2006/0243353 | A1 * | 11/2006 | Milam | B23K 11/0033 148/524 |
| 2009/0180725 | A1 * | 7/2009 | Galehouse | F16C 33/64 384/492 |
| 2010/0227188 | A1 * | 9/2010 | Takayama | B22F 7/04 428/565 |
| 2010/0247949 | A1 * | 9/2010 | VanDyke | B23K 20/021 428/615 |
| 2014/0346216 | A1 * | 11/2014 | Rigal | B23K 20/021 228/194 |
| 2015/0167131 | A1 * | 6/2015 | Bullard | C22C 38/18 428/610 |

FOREIGN PATENT DOCUMENTS

| | | | |
|---|---|---|---|
| JP | 54074250 A * | 6/1979 | |
| JP | 58128281 A * | 7/1983 | |
| JP | 62176659 A * | 8/1987 | |
| JP | 01202381 A * | 8/1989 | |
| JP | 09076077 A * | 3/1997 | |
| JP | 3425496 B2 * | 7/2003 | |
| JP | 2004243380 A | 9/2004 | |
| JP | 2005169419 A | 6/2005 | |
| SU | 633690 A | 11/1978 | |
| WO | 9527586 A1 | 10/1995 | |

* cited by examiner

METHOD OF JOINING TWO MATERIALS BY DIFFUSION WELDING

CROSS REFERENCE TO RELATED APPLICATION

This is a United States National Stage Application claiming the benefit of International Application Number PCT/SE2014/000043 filed on 7 Apr. 2014, which claims the benefit of Sweden (SE) Patent Application 1300262-1 filed on 10 Apr. 2013, both of which are incorporated herein by reference in their entireties.

TECHNICAL FIELD

This invention presents a method of joining two materials by means of diffusion welding or hot isostatic pressing.

BACKGROUND OF THE INVENTION

Joining two materials by diffusion welding and hot isostatic pressing is known.

SUMMARY OF THE INVENTION

An object of the invention is to provide an improved method of joining two materials by diffusion welding or hot isostatic pressing. When forming high quality components that need to endure high loads during a long period of time, such as bearings or pressing tools etc, known methods to join two materials by diffusion welding or hot isostatic pressing are sensitive to generate weak zones in the transition zone where the materials join each other. There may be a carbon potential between the materials, i.e. one of the two joined materials may gain carbon in the joining process while the other material may lose carbon. A carbon potential is explained by the ability of an environment containing active carbon to alter or maintain, under prescribed conditions, the carbon level of a steel. In any particular environment, the carbon level attained will depend on such factors as temperature, time and steel composition. Carbon potential is thus a difference in carbon activity between e.g. two materials. Thus if there is a difference in carbon activity, i.e. when the carbon potential is not zero, the carbon will diffuse from one material to the other. The carbon gradients in the two materials may result in weak and brittle phases during a subsequent heat treatment. A transition zone with larger fraction of weaker brittle microstructure phases such as cementite networks or complex metal carbides may significantly reduce the strength of any or both of the two joined materials. By selecting the alloying content of the two joining materials and/or adopting the process temperature the diffusion rate of carbon between the materials can be reduced. The hardening properties of both alloys are then to a large extent preserved and the volumes surrounding the transition zone will not have large volume of weak or brittle phases. The two materials keep its ability and microstructure all the way to the transition zone. The size of the transition zone is reduced and the potential problems of material brittleness etc. are reduced. The inventor has realized that some materials that could be of benefit to join with each other still do have a high carbon potential even though the alloying content and the temperature is adapted to reduce this difference. This is for instance the case when joining materials of different qualities, such as joining a cheaper cast iron or cast steel having high carbon content with a high cleanliness steel with low carbon content.

The object of the invention has been achieved by providing a method to join a first and a second material by means of diffusion welding, wherein a third material is put in between the first and the second material during the joining process. By providing an intermediate material one can prevent that the first and second materials with a high carbon potential reacts with each other and creates a carbon content in the transition zone that is essentially above or below the content of the first and the second material. By carbon content is meant the medium value in the material. The carbon content may naturally vary and have local variations, but what is meant is the overall medium value of the material. The carbon content shall be measured along the cross section of the joined materials, the cross section being made perpendicular to the surface where the materials join. Having this said, the surface to be joined does by no means need to be flat, since also rounded surfaces have a perpendicular direction. The transition zone is the area where the change in carbon content due to the joining process can be observed in the materials. If the carbon content is not above the carbon content of the first and second material it is an indication that the carbon has not reacted to form cementites or complex metal or iron carbides that are hard and brittle. Instead the carbon has diffused into the third material in a controlled manner. The strength of the transition zone is thus ensured.

Exemplifying and advantageous embodiments of the bearing joining method according to the invention will now be presented.

In an embodiment of the method, the third material is a low carbon steel. In a further embodiment the low carbon steel has a carbon content of less than 0.3 weight % (wt %), but it could easily be as low 0.05 wt % and as high as 0.6 wt %. In another embodiment the low carbon steel is a terrific steel. By having a material with very low carbon content, the material will attract carbon from both the first and the second material, slowly evening out the differences in carbon content between the first and second material, since the carbon content of both the first and second material is higher than the low ferritic steel. This way the process is controlled so that no weak and brittle cementite or other unwanted complex carbides are created, and the strength of the transition zone is further ensured. In another embodiment of the method, the third material is a sheet metal. This way it can easily be formed to encapsulate and abut the first and the second material. In yet another embodiment of the method the thickness of the third material is 0.5-10 mm thick. The thickness is selected in relation to process temperature and time in such way that the material which will be subjected to the highest stress is neither carbon enriched nor significantly carbon depleted. The ring core material is allowed to be slightly depleted in carbon while the transition material is enriched with carbon allowing it to be at least partly having a martensitic structure in a following hardening operation. In another embodiment the third material also contains nitrogen. This is to prevent nitrogen from diffusing from the first material, which could affect its material properties. In a further embodiment several intermediate materials are put in between the first and the second material in order to allow for the carbon to diffuse in a controlled and optimum manner.

In an embodiment of the method, the first and the second material present a carbon potential at the temperature of joining. When joining two materials by diffusion welding it is good if the two materials have no carbon potential, i.e. the materials have roughly the same carbon activity, to prevent carbon from diffusing from one material to the other. In some cases there are possibilities to find a common carbon activity between the materials by adapting the carbon content in relation to each other and/or adapting the joining temperature. In some cases there are no possibilities to find a common carbon activity, it could be because it is not possible to adapt the temperature due to production economic reasons, the qualities of the materials to join are so specific that it is not possible to amend the carbon content of them. It could also be because it simply not physically possible to find a common carbon activity even if the above methods are tried, such as for instance some cast irons and high cleanliness bearing steels. It is during these circumstances when this inventive method of including a third material is particularly applicable with good results.

In an embodiment of the method, the first material is a high cleanliness steel, such as a bearing or tool steel. Of special interest are corrosion resistant and/or wear resistant steels. In an embodiment it is a M50 steel. In a further embodiment it is a M50NIL steel. In yet another embodiment it is any of the traditional bearing steel as shown in ISO 683-17:1999(E) pages 9-10. Any other steels that meet the steel cleanliness and hardness requirements of a bearing component could be used, for instance stainless tool steels. In a further embodiment the material used is a martensitic hardenable stainless N-alloyed steel, such as XD15NW or other stainless martensitic hardenable steels made with good steel cleanliness. The invention is however not limited to these steels. The benefit of using these types of steel is that the portion consisting of this material will be very robust against wear and corrosion for instance. Hence the high cleanliness steel is preferably located around the highly stressed areas of the components, for instance around the raceway of a bearing ring or the rolling surface of a bearing roller. It could also be located for instance at a flange or any other portion or area of a bearing component, or combinations of flange, raceways and rolling surfaces.

In an embodiment of the method, the second material (2) is a cast iron. In a further embodiment the second material is a cast iron with a carbon content of at least 2%. A cast iron typically contains between 2.1-4 wt % carbon. In yet another embodiment of the method the second material (2) is a cast steel. In a further embodiment the second material is a cast steel with a carbon content of 0.5 wt % or less, but it could be as much as 2 wt %. These materials are often cheaper than high cleanliness steels, thus preferably the main part of the component can be made by cast iron or cast steel, after which the more expensive high cleanliness steel can be applied at the most critical areas that requires it. In another embodiment this cast iron/steel part of the material to be joined is formed by casting. This is cheaper than other traditional forming methods, but it could of course also be made by rolling or forging or any other warm or cold working method. This part may be the main part of component, for instance in the case of a bearing it could be the central part of a roller, or the ring part that does not constitute the part enduring heavy load, such as the raceway or flange.

In an embodiment of the method, the method is done by means of hot isostatic pressing. This comprises steps of heating the materials pressing them against each other under specific pressure, period of time and temperature, thereby allowing the materials to diffuse into each other. In an embodiment of the method the temperature of joining is 1000-1300 degrees Celsius (C). In another embodiment of the method, the temperature of joining is 1100-1200 degree C. In a further embodiment of the method, the temperature of joining is 1140-1160 degree C., preferably 1150 degree C. But it could also be 1145-1155 degree C. for instance. In an embodiment of the method the pressure is 80-310 MPa. In an embodiment of the method the time of joining is between 2-4 hours. This is a typical time. Shorter or longer time may be required depending on component thicknesses, such as 1-6 hours In an embodiment of the method, at least one of the first and the second material is in powder form before heating. In another embodiment, it is the high cleanliness steel that is in powder form before heating. In a further embodiment of the method, a sheet metal is used to encapsulate the powder during the joining process. The sheet metal is then removed. The sheet metal used as an example in this embodiment can be exchanged to any other suitable material known to the person skilled in the art.

In an embodiment of the method, the method is used to form a mechanical component. In another embodiment the method is used to form a tool, such as a pressing tool. In a further embodiment the method is used to form a bearing component, wherein the bearing component is any of an inner ring, an outer ring or a roller of a bearing.

In an embodiment of the method, the materials (1, 2, 3) present a carbon potential towards each other at the temperature of joining. This is why the third material is needed and this is why the first and second material diffuse carbon into the third material in a controlled manner.

BRIEF DESCRIPTION OF DRAWINGS

Exemplifying embodiments will now be described more in detail with reference to accompanying drawings, as well as examples of undesirable features that the invention help to prevent, wherein.

The drawings present examples of the invention, and the undesirable features that the invention helps to prevent, in diagrams and graphs. These are exemplifying embodiments, thus they are not drawn to scale. Some details and features may even be exaggerated to better explain the invention. The invention is not limited to the embodiments and drawings described herein.

DETAILED DESCRIPTION OF DRAWINGS

Figures 1A, 1B:
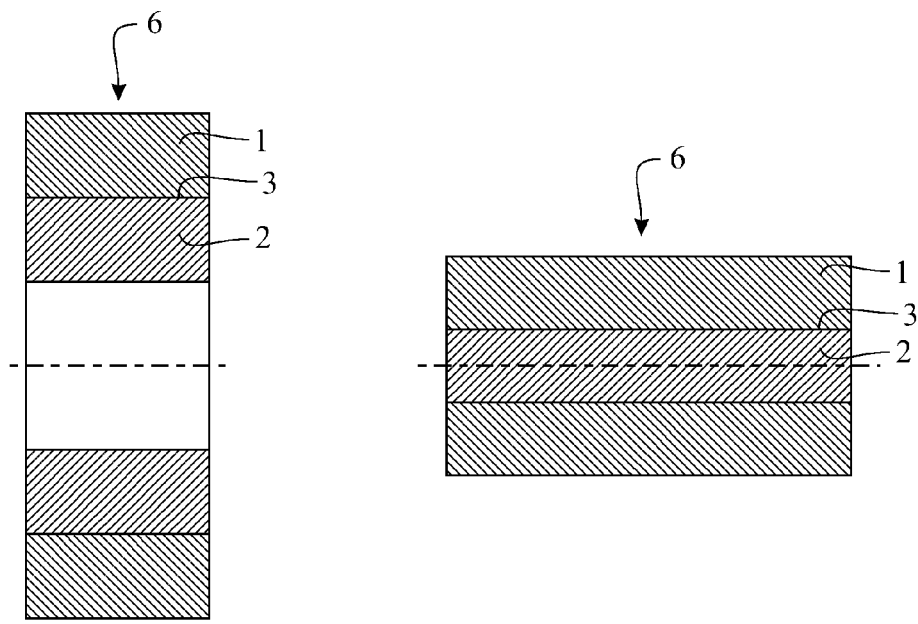
FIG. 1a shows a cross section of a bearing ring made by the method according to the invention.
FIG. 1b shows a cross section of a roller for a bearing made by the method according to the invention.

FIG. 1a shows a cross section of a bearing component 6 joined by the method according to the invention, bearing component 6 being a ring. The bearing ring comprises a first 1 and a second 2 material wherein the diffusion welding process has taken place between the first 1 and second 2 material, where the third material 3 is located. The figure shows a bearing ring, where the materials are aligned along the full width of the component, but it could also be so that one material is only applied on a selected portion of the component, such as for instance a raceway or a flange (not shown in figure).

FIG. 1b shows a cross section of a bearing component 6 joined by the method according to the invention, bearing component 6 being a roller. The roller comprises a first 1 and a second 2 material wherein the diffusion welding process has taken place between the first 1 and second 2 material, where the third material 3 is located. The figure shows a roller where the materials are aligned along the full width of the component, but it could also be so that one material is only applied on a selected portion of the component, such as for instance the main rolling surface or at the edges of the roller, etc.

Figure 2:
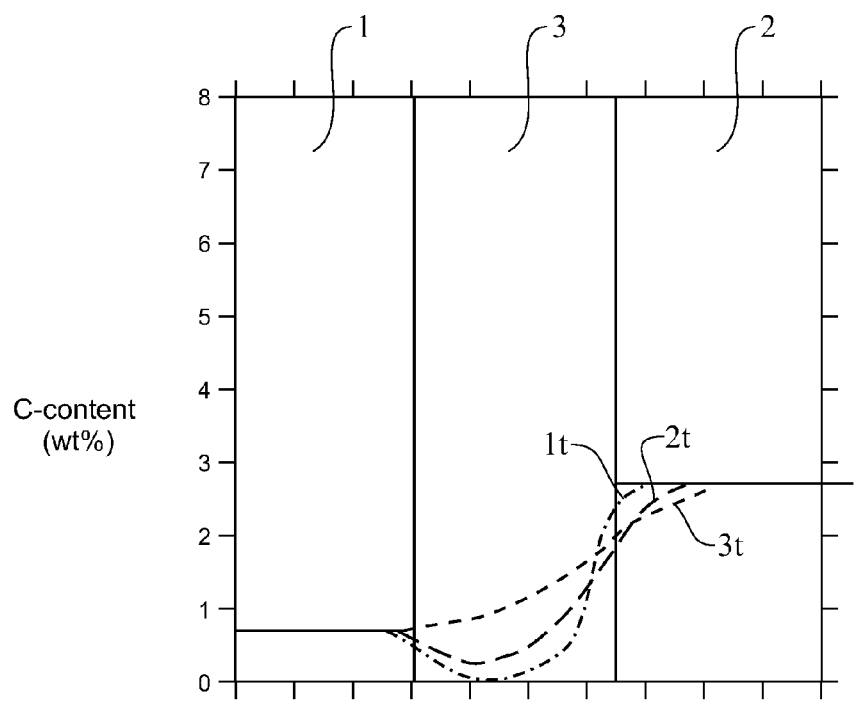
FIG. 2 shows a graph illustrating two materials' carbon content diffusing into a third material according to the invention.

FIG. 2 shows a graph of a desirable carbon content change according to the invention. The change in carbon content due to the joining process can be observed in the graph as carbon diffuses from the first material 1 and the second material 2 into the third material 3 more and more as the joining process proceeds 1*t*, 2*t* and 3*t*, most diffusion occurs from the carbon rich second material 2. The carbon content of the first 1 and second 2 material in this example is almost 1 and 3 wt % respectively. Here it can be clearly seen that the carbon content have not increased dramatically at any points, which indicates that the carbon has not formed cementites nor more complex carbides that can be larger in comparison to the surrounding structure, for instance a martensitic structure, thus generally weaker than the surrounding materials. This would be unacceptable in high performance mechanical components, such as high quality bearing components. In this figure is shown only one material 3 in between the materials 1 and 2 to be joined. There could also be several layers of suitable materials known to the person skilled in the art to achieve the results according to the principle of the inventive method described herein. The distance unit of the x-axis is not specified in this graph since it functions more as an example describing the principle with exaggerated proportions, but a typical distance where this would occur would be 5-20 mm from the surface of a component to be joined, for instance a from the bearing race, and the typical thickness of the third material is in the order of millimeters typically 0.5 to 5 mm. Other thicknesses may be used.

Figure 3:
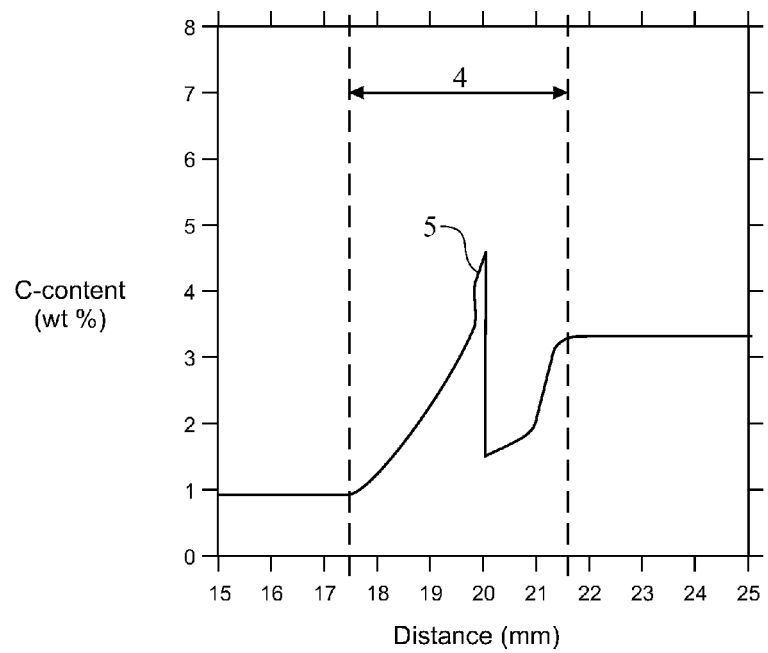
FIG. 3 shows a graph illustrating an undesirable carbon content change.

FIG. 3 shows a graph illustrating an undesirable peak 5 in carbon content. The carbon has clearly moved from one material to the other. The carbon content clearly exceeds the carbon contents of one of the materials of 3.5 wt % at one point reaching almost 5 wt % carbon at a depth of 20 mm from the surface of the materials to be joined, in this case a bearing race. The curve is un-linear. The carbon content shall be measured along a cross section of the joined materials, the cross section being made perpendicular to the surface where the two materials join. Having this said, the surface to be joined does by no means need to be flat, since also rounded surfaces have a perpendicular direction. Shown in the figure is also the transition zone 4 where the change of carbon content can be measured due to the diffusion welding process.

Figure 4:
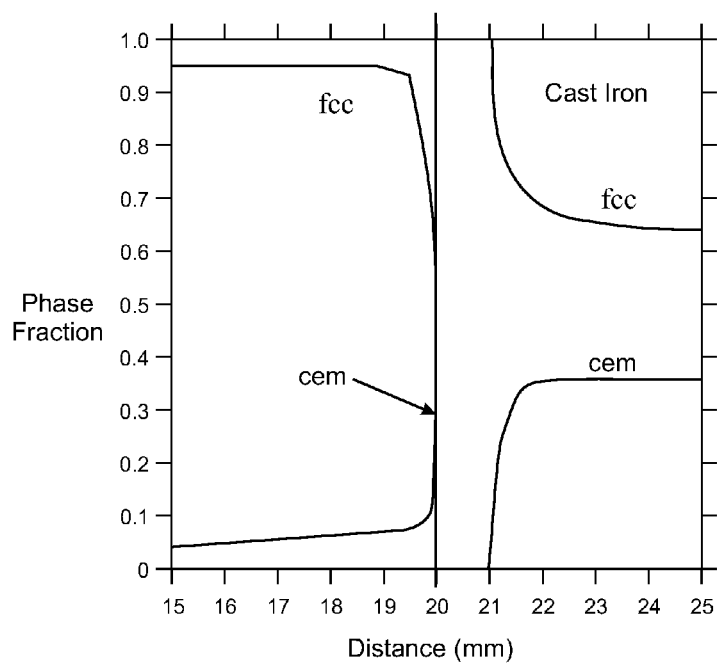
FIG. 4 shows a graph illustrating a phase fraction during the undesirable carbon content change from FIG. 3.

FIG. 4 shows a graph illustrating a phase fraction during the undesirable peak (5 in FIG. 3) in carbon content change from FIG. 3. From the simulations at the process temperature it can be clearly seen that the carbon content increase that went beyond carbon content of one of the materials in an un-linear way, has resulted in a zone where the austenite (fcc) microstructure has increased dramatically, simultaneously as larger fraction of weaker brittle microstructure phases such as cementite (cem) networks or other complex metal carbides has formed. Both microstructures went from being around 10% of the total microstructure to around 90% at a depth off 20 mm from the surface of the bearing component. This may significantly reduce the strength of any or both of the two joined materials. The cementite structure does not necessarily have to occur during the joining as such, but the higher level of carbon content could react and form a weak and brittle cementite phases during a subsequent heat treatment. At a depth off 21 mm from the surface of the bearing component we can see the normal face fractions of the materials at the process temperature again consisting of cementite and austenite cast iron to a large extent.

The invention claimed is:

1. A method to join a first material and a second material by diffusion welding,
    wherein a third material is put in between the first material and the second material during the joining process,
    wherein the first material is a tool steel or a bearing steel, the second material is a cast iron or a cast steel and the third material is low-carbon steel,
    wherein the first material and the second material present a carbon potential at the temperature of joining.

2. The method according to claim 1, wherein the third material has a carbon content of less than 0.3%.

3. The method according to claim 1, wherein the third material is a ferritic steel.

4. The method according to claim 1, wherein the third material is a sheet metal.

5. The method according to claim 1, wherein the thickness of the third material is 0.5-10 mm.

6. The method according to claim 1, wherein the first material is one of:
    M50,
    M50 NIL,
    XD15NW,
    Bearing steel as shown in ISO 683-17:1999(E) pages 9-10,
    Stainless tool steel,
    Stainless steel suitable for martensitic hardening,
    N-alloyed stainless steel, suitable for martensitic hardening, or
    Stainless steel suitable for surface enrichment and martensitic hardening.

7. The method according to claim 1 wherein the second material is the cast iron.

8. The method according to claim 7, wherein the second material has a carbon content of at least 2 wt %.

9. The method according to claim 1, wherein the second material is the cast steel.

10. The method according to claim 9, wherein the second material is has a carbon content of 0.5 wt % or less.

11. The method according to claim 1, wherein the method is accomplished by hot isostatic pressing.

12. The method according to claim 1, wherein at least one of the first material and the second material is in powder form before heating.

13. The method according to claim 1, wherein the method is used to form a mechanical component.

14. The method according to claim 1, wherein the method is used to form a bearing component, wherein the bearing component is one of:
    an inner ring of a bearing, or
    an outer ring of the bearing, or
    a roller of a roller bearing.

15. A method to join a first material and a second material by diffusion welding comprising:
    placing a third material between the first material and the second material; and
    joining the first material to the second material by diffusion welding, wherein the first material and the second material present a carbon potential at the temperature of joining, and
wherein the first material is a tool steel or a bearing steel, the second material is a cast iron or cast steel and the third material is a low-carbon steel.

16. The method according to claim 15, wherein the third material has a carbon content of less than 0.3%.

17. The method according to claim 16, wherein the third material is a ferritic steel.

18. The method according to claim 15, wherein the third material is a ferritic steel.

19. The method according to claim 15, wherein the second material is the cast iron and has a carbon content of at least 2 wt %.

20. The method according to claim 15, wherein the second material is the cast steel and has a carbon content of 0.5 wt % or less.

* * * * *